United States Patent [19]

Masaoka et al.

[11] 4,234,119
[45] Nov. 18, 1980

[54] METHOD OF MAKING A STRUCTURE IMMUNE AGAINST STRESS CORROSION CRACKING

[75] Inventors: Isao Masaoka; Katsuyuki Imai, both of Hitachi, Japan

[73] Assignee: Hitachi, Ltd., Japan

[21] Appl. No.: 933,555

[22] Filed: Aug. 14, 1978

[30] Foreign Application Priority Data

Aug. 12, 1977 [JP] Japan .................................. 52-96033

[51] Int. Cl.² ........................................... B23K 31/02
[52] U.S. Cl. ............................... 228/125; 219/137 R; 228/168; 228/226
[58] Field of Search .................... 219/60 A, 61, 137 R; 228/119, 125, 165, 166, 167, 168, 169, 182, 225-226

[56] References Cited

U.S. PATENT DOCUMENTS

| | | | |
|---|---|---|---|
| 2,819,517 | 1/1958 | Pursell | 228/168 |
| 3,849,871 | 11/1974 | Kaunitz | 219/137 R X |
| 4,049,186 | 9/1977 | Hanneman et al. | 228/119 X |
| 4,079,224 | 3/1978 | Haga et al. | 219/137 R X |

FOREIGN PATENT DOCUMENTS 2748534 10/1977 Fed. Rep. of Germany .

Primary Examiner—Francis S. Husar
Assistant Examiner—K. J. Ramsey
Attorney, Agent, or Firm—Craig and Antonelli

[57] ABSTRACT

A groove is provided on the side of a metallic structure opposite to the side thereof which is exposed to a corrosive atmosphere, and the groove is subjected to build-up welding while cooling with a liquid coolant, whereby any stress corrosion cracking which otherwise occurs on the side of the structure to be exposed to the corrosive atmosphere can be prevented. Especially, this method of manufacture is appropriate for the repair welding of a butt-welded pipe of austenite type stainless steel, and it is effective to perfectly prevent the stress corrosion cracking of the pipe prone to be caused by reactor water during use in a nuclear reactor.

14 Claims, 6 Drawing Figures

METHOD OF MAKING A STRUCTURE IMMUNE AGAINST STRESS CORROSION CRACKING

BACKGROUND OF THE INVENTION (1) Field of the Invention

This invention relates to a method of manufacturing a structure immune against stress corrosion cracking. More particularly, it relates to a novel method of repair-welding austenite type stainless steel pipes which is appropriate for preventing the stress corrosion cracking that occurs in the welding heat-affected zones of the steel pipes of a chemical plant, an atomic energy plant etc. in any corrosive atmosphere.

(2) Description of the Prior Art

In general, when austenite type stainless steel is heated to 500°–800° C., carbides precipitate in the grain boundary. The precipitation of carbides is noted even when the material is heated to a high temperature for a short time as in welding. Under specific corrosive environments, stress corrosion cracking is liable to occur due to a residual tensile stress or external tensile stress acting on such a part.

Also, when ferrite type stainless steel is subjected to welding, a residual welding stress of tension appears in the welded part, and stress corrosion cracking often occurs under corrosive environments. Also in case of low alloy steel and high tension steel, joints subjected to ordinary weldings are prone to undergo stress corrosion cracking in the atmosphere of hydrogen sulfide.

In this manner, the stress corrosion cracking usually takes place by the combination of the material factor and the corrosive environment. As expedients for preventing the stress corrosion cracking, there have been taken a countermeasure for the austenite type stainless steel in which the precipitation of carbides is prevented and a countermeasure for the ferrite type stainless steel in which the material is made difficult to corrode under the corrosive environments.

Since heat is applied in ordinary welded joints, the weld zone and the vicinity thereof reach a considerably high temperature and simultaneously undergo a high residual tensile stress, which provides a cause for a tendency to undergo stress corrosion cracking. It is therefore necessary to prevent the rise of the temperature of a part which is exposed to corrosive environments. If the high residual tensile stress can be lowered, the stress corrosion cracking-resistance can be made conspicuously high.

As processes for reducing the residual tensile stress, there have heretofore been the stress relief annealing, the Linde process, the overstraining, the peening, the vibrational stress relieving, etc. The Linde process is such that, after completion of welding, both the sides of a weld zone are heated. The overstraining is such that, after welding, an external force is exerted to give rise to a plastic strain locally. Although these processes can moderate the residual tensile stress to some extent, neither of them can add a residual compressive stress. The peening involves a difficulty in point of reproducibility.

In this manner, any of the conventional processes for reducing the residual tensile stress cannot bring forth a satisfactory result.

As an expedient for preventing the stress corrosion cracking of the weld zone of an austenite stainless steel pipe which is used under any corrosive environment, there has been a method of welding wherein after a preceding step of welding to the extent that a cooling medium does not flow out to the exterior, a succeeding step of welding is carried out while forcibly cooling the inner surface of the steel pipe. It has been known that a joint welded by this method is more excellent in the stress corrosion cracking-resisting property of the inner surface of the pipe than a joint fabricated without forcibly cooling the inner surface of the pipe during welding. The inventors, however, have revealed as the result of various studies that when a defect found out by an inspection in the course of or after completion of the welding in this welding process is locally welded for repair, a residual tensile stress appears in the weld zone in dependence on conditions of the repair welding. Accordingly, as regards the welded joint which poses the problem of the stress corrosion cracking and which includes at a part thereof the defect caused during the welding, the mere welding for repair of the defect part is unsatisfactory in that there is a high possibility of causing cracking again.

Further, a repair welding process for a steel pipe is disclosed in U.S. Pat. No. 4,049,186. This process is such that, while letting water flow in the steel pipe, the build-up welding is done in a weld zone on the outer periphery of the steel pipe. It is described that, according to the process, the tendency for stress corrosion cracking that is usually caused in the inner surface of the steel pipe by a residual tensile stress attributed to welding when the inner surface of the pipe is exposed to a corrosive atmosphere as in an atomic energy plant is reduced.

However, in case where the wall of the steel pipe is thick, this repair welding process cannot make the residual tensile stress of the inner surface of the steel pipe ascribable to the repair welding sufficiently low and cannot satisfactorily prevent the stress corrosion cracking. That is, in the case of the thick-walled steel pipe, even when the temperature difference between the build-up welding zone and the inner surface of the steel pipe is great, obviously a local temperature difference or temperature gradient in the inner surface of the steel pipe is small, so that the residual tensile stress cannot be sufficiently diminished in the inner surface of the steel pipe. The reason why the build-up welding on the outer surface of the steel pipe will be insufficient is that the outer surface of the steel pipe is expanded by being subjected to the shrinkage deformation of a deposit metal and the heating of the build-up welding, the expanded part being constrained at both it ends to undergo a compressive deformation, which gives a shrinkage deformation attendant upon cooling after the welding. However, the shrinkage deformation of the outer surface of the steel pipe owing to the build-up welding is attained only by a thermal expansion based on heating attendant upon the fusion of the outermost surface of the steel pipe and the welding heat, and the effect of reducing the residual tensile stress of the inner surface of the steel pipe is not sufficiently demonstrated.

SUMMARY OF THE INVENTION (1) OBJECTS OF THE INVENTION

An object of this invention is to provide a method of manufacturing a structure which can effectively reduce a residual tensile stress and prevent stress corrosion cracking.

Another object of this invention is to provide a method of manufacturing a structure which can put into a compressive stress the residual stress of a welding heat-affected zone in the inner surface of a steel pipe that is exposed to a corrosive atmosphere as a structural member.

Still another object of this invention is to provide a method of manufacturing a structure which can prevent the stress corrosion cracking of a weld zone in an austenite type stainless steel pipe that is used in a nuclear reactor plant as a structural member.

(2) BRIEF SUMMARY OF THE INVENTION

The method of manufacturing a structure according to this invention is a method wherein a groove for welding is provided on the side of a metallic structure opposite to the side thereof which is exposed to a corrosive atmosphere and wherein the groove is padded by build-up welding while cooling by holding water or any other liquid coolant in contact with at least that part on the side to be exposed to the corrosive atmosphere which corresponds to the groove and wherein the groove has a volume necessary for substantially reducing or eliminating a residual tensile stress on the side of the structure to be exposed to the corrosive atmosphere, owing to shrinkage of a metal of the build-up welding. At least a part of the metallic structure forming the bottom of the groove and having a thickness equivalent to that of the first-layer of the metal deposited weld is left intact. In accordance with the manufacturing method of this invention, the residual tensile stress of the surface to be exposed to the corrosive atmosphere is substantially relieved or removed or turned into a residual compressive stress, so that the stress corrosion cracking can be prevented. The first layer of the weld should, in general be about 2 mm thick and up to about 5 mm.

More specifically, in this invention, a groove is formed in a structure and is padded with a molten metal. Thus, a conspicuous shrinkage deformation develops with the solidification of the metal, and a conspicuous residual tensile stress arises in the outer surface of the weld zone on account of the constraint of both the ends of the shrunk part. In proportion to the magnitude of the residual tensile stress, the surface to be exposed to a corrosive atmosphere has its residual tensile stress drastically relieved or removed or gains a residual compressive stress. Accordingly, this invention achieves a greater effect than the mere build-up welding on the surface of the structure or the mere heating of the surface of the structure.

When applied to a pipe as a structure, this invention is the most effective. That is, since the pipe exhibits the greatest self-constraint, the invention is the most suitable for forming a residual compressive stress in the inner surface of a pipe.

When applied to an austenite type stainless steel pipe liable to stress corrosion cracking, this invention is appropriate for preventing the stress corrosion cracking.

This invention is appropriate for a repair welding of a steel pipe wherein a groove for welding is provided in an outer surface of the butt-welded steel pipe in a weld zone of the structure in which an inner surface of the steel pipe is exposed to a corrosive atmosphere and wherein the groove is welded again by build-up welding while cooling by holding a liquid coolant in contact with at least a welding heat-affected zone of the steel pipe, and the invention is characterized in that the groove has a volume necessary for substantially reducing or eliminating a residual tensile stress in the inner surface of the steel pipe in the weld zone, owing to shrinkage of a metal of the build-up welding, and in that at least one welding pass up to the fifth layer in the original or initial weld zone is left in providing the groove. According to this invention, the residual tensile stress in the inner surface of the steel pipe in the weld zone is drastically relieved, and the cracking-resisting property of austenite type stainless steel which is prone to stress corrosion cracking in a corrosive atmosphere as a steel pipe can be remarkably enhanced.

In case of applying this invention to the repair welding of the steel pipe, the groove is provided in the outer surface of the steel pipe. Further, it may extend over the whole periphery of the steel pipe or a part thereof in the circumferential direction. In either case, the groove is formed in such a manner that at least one pass up to at most the fifth layer in the initially formed weld zone is left to from the bottom surface of the groove. Therefore, it is unnecessary to align the steel pipes in welding them for repair, and the welding job can be simply carried out. Regarding the extention of the groove, however, it is especially effective to subject the whole periphery of the steel pipe to the build-up welding.

That is, in this invention, the welding is done while cooling with water or any other liquid coolant, whereby the build-up welding is done while maintaining the inner surface of the steel pipe in a low temperature state. With cooling and shrinkage of the padding metal of the build-up welding, therefore, the residual tensile stress of the part is drastically relieved, or a residual compressive stress can be produced. According to this invention, the weld zone of the austenite type stainless steel pipe which is prone to the stress corrosion cracking due to exposure to the corrosive atmosphere as in an atomic energy plant or chemical plant as previously described can have its cracking resistance enhanced remarkably.

According to this invention, even when cracking has occurred in the vicinity of the original first-layer weld zone during use, the residual tensile stress of the inner surface of the steel pipe can be diminished or turned into the residual compressive stress, so that the advance of the cracking can be arrested.

A preferred method in which this invention is applied to the repair welding of the weld zone of the butt-welded steel pipe is characterized in that the original first-layer weld zone left in the groove is molten again and solidified under the state of natural cooling, whereupon the second and further layers are deposited while cooling. By melting the original first-layer weld zone again, any metallographic and surface conditions which have occurred during use can be improved to the original conditions, and simultaneously, the cracking of the welding heat-affected zone which has occurred during use as previously stated can be eliminated. Further, by the subsequent welding, the residual tensile stress can be reduced or turned into the residual compressive stress. It is therefore possible to remarkably enhance the stress corrosion cracking-resistance.

A preferred method of this invention is characterized in that the welding is performed while letting a liquid coolant flow directly in the steel pipe or while spraying a liquid coolant to the weld zone on the side which is exposed to the corrosive atmosphere. According to this method, the effect of cooling is more enhanced, and the residual tensile stress of the inner surface of the steel pipe can be more relieved or the residual compressive stress can be more raised, so that the stress corrosion cracking-resistance can be enhanced still more.

A preferred method in which this invention is applied to the repair welding of the butt-welded steel pipe which is welded during water cooling in which water is in direct contact with the inner surface of the pipe, is characterized in that the circumferential length L (in millimeters) of the groove for welding is made equal to or greater than a value obtained by the following equation:

$$L = (45 S_1 \log D)/S_2$$

wherein D denotes the diameter (in mm) of the steel pipe, $S_1$ the sectional area (in mm²) indicative of the groove shape of the original weld zone except the first-layer of the weld zone, and $S_2$ the sectional area (in mm²) indicative of the groove shape providing the re-welding zone. Thus, it will be understood that the sectional areas designated, respectively, by $S_1$ and $S_2$ are in the same radial plane that this radial plane extends along the longitudinal axis of the steel pipe. The residual stress of the welding heat-affected zone in the inner surface of the steel pipe can be perfectly brought into the compression state. As a result, the stress corrosion cracking can be completely prevented.

A preferred method in which this invention is applied to the repair welding of the steel pipe demonstrates a great effect when used for a pipe of austenite type 304 stainless steel. The method is characterized in that a groove for welding is provided in the outer surface of the original or initial butt weld zone of the austenite type stainless steel pipe in such a manner that at least the original first-layer of the weld zone is left, and new layers of weld metal are deposited while cooling by letting a liquid coolant flow in the steel pipe, within the groove for the build-up welding and by the use of austenite type 308L stainless steel for the weld metal. According to this method, the stress corrosion cracking-resisting property of the austenite type stainless steel pipe can be remarkably enhanced.

A preferred method in which this invention is applied to the repair welding of the steel pipe is particularly effective in remarkably enhancing the stress corrosion cracking-resistance in the piping of an atomic energy plant. This method is characterized in that in the outer surface of the butt weld zone of an austenite type 304 stainless steel pipe which is butt welded during cooling with a liquid coolant in an atomic energy plant, a groove for welding which has a length L (mm) equal to or greater than a value obtained by the foregoing equation:

$$L = (45 S_1 \log D)/S_2$$

is provided so that the original first-layer of the weld zone of the steel pipe is left intact, and in that while cooling by letting a liquid coolant flow in at least the steel pipe or by spraying a liquid coolant to the weld zone in the steel pipe, at least one layer of weld metal is deposited within the groove by build-up welding by the use of austenite type 308L stainless steel as the weld metal.

By carrying out the repair welding of the length specified above, the welding heat-affected zone in the inner surface of the steel pipe can be brought to a residual stress of compression. According to the above equation, in case where the diameter of the steel pipe is 15 mm or less, the welding must be done over the whole periphery in order to create the residual compressive stess.

As set forth above, according to the method of this invention for preventing the stress corrosion cracking by the build-up welding, a groove is provided and is padded, i.e., filled in with weld metal, so that the concentrating property of arcs is enhanced. Owing to the build-up welding, sudden and intense energy can be given to a member to-be-welded, so that abrupt temperature gradients in the inner and outer surfaces of the structure can be attained. Further, a great shrinkage deformation caused by the solidification shrinkage of a molten metal is checked at both the ends of the groove, whereby a residual tensile stress which has substantially no influence on stress corrosion cracking can be created in the surface to be exposed to any corrosive environment, and a sufficiently high residual compressive stress can be bestowed on that surface.

This invention will be further understood from the following detailed description and examples.

EXAMPLE 1

Figure 1A:
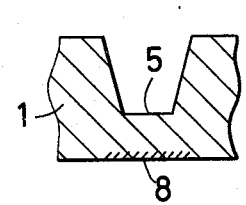
FIGS. 1(a) and 1(b), FIGS. 2(a) to 2(c), FIGS. 3(a) and 3(b) are sectional constructional views taken along a axial plane extending along the axis of the pipe illustrative of examples of the method of manufacturing a structure according to this invention, this invention being applied to weld zones of steel pipes in the examples of FIG. 2(a) to FIG. 3(a)
Figure 1B:
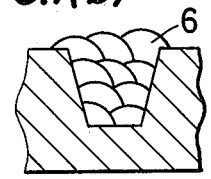

FIGS. 1(a) and 1(b) are sectional constructional views illustrative of the method of manufacturing a structure according to this invention. FIG. 1(a) shows the state in which, when stress corrosion cracking becomes a problem in the front surface of a parent metal 1, a groove 5 for welding is provided in the corresponding part on the rear surface side. FIG. 1(b) shows the state in which the groove 5 is subjected to build-up welding 6 while cooling by holding the corrosion surface side in contact with a liquid coolant. Numeral 8 designates that part of the structure in which a residual tensile stress posing the stress corrosion cracking has occurred on account of a bending working or the like.

EXAMPLE 2

This example concerns a 304 stainless steel pipe in which a residual tensile stress has occurred in the inner surface of the pipe. The steel pipe was an 8-inch pipe of finish schedule 80. The residual stress of the inner surface of the steel pipe was a tensile stress of 15 Kg/mm². The wall thickness of the steel pipe was 12.7 mm, and a groove for welding which was 4 mm deep from the outer surface of the pipe was formed over the whole periphery of the pipe. The width of the surface of the groove at this time was 40 mm. Under a heat input of about 15 KJ/cm and while letting city water of 30 l/min flow on the inner surface of the pipe, welding was carried out by the use of a welding rod 308L. In this case, the temperature of the inner surface of the pipe was measured and was 430° C. at the highest during the welding. The welded steel pipe had its outer surface subjected to coating, and was immersed in a 42% $MgCl_2$ solution and boiled for 8 hours. As a result, the welded portion of the steel pipe formed with the groove in the outer surface of the pipe underwent quite no stress corrosion cracking even by the immersion and boiling in $MgCl_2$. In contrast, innumerable cracks occurred in the parent metal of the steel pipe. It has, accordingly, been revealed that the stress corrosion cracking can be drastically relieved by applying the method of this invention.

COMPARATIVE EXAMPLE 1

This comparative example concerns a stainless steel pipe in which a residual tensile stress has occurred in the inner surface of the pipe. The pipe was an 8-inch pipe of finish schedule 80 as made of stainless steel AISI304. The residual stress of the inner surface of the steel pipe was a tensile stress of 15 Kg/mm². The wall thickness of the steel pipe was 12.7 mm. Without providing any groove, the steel pipe was subjected to build-up welding with a deposit metal 308L over the whole periphery of the surface of the steel pipe under a heat input of about 15 KJ/cm and while letting water flow in the steel pipe at a rate of about 30 l/min. The width of the build-up welding was made 40 mm as in Example 2. As to the steel pipe subjected to the build-up welding, a stress corrosion cracking test for 8 hours was conducted under the same conditions as in Example 2. As a result, slight cracking was noted in the inner surface of the steel pipe.

EXAMPLE 3

Figure 2A:
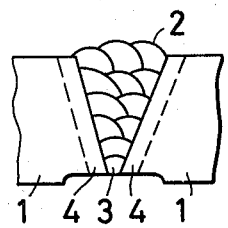
Figure 2B:
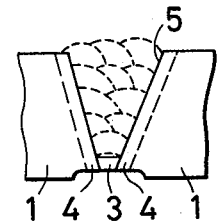
Figure 2C:
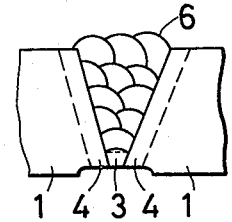

FIGS. 2(a) to 2(c) are model diagrams in the case where this invention was applied to the repair welding of a weld zone in a butt-welded steel pipe. FIG. 2(a) shows a section of the steel pipe 1 butt-welded by a deposit metal 2. Numeral 3 designates a first-layer weld zone, and numeral 4 a welding heat-affected zone. FIG. 2(b) illustrates the situation wherein the pipe 1 has been provided with a groove 5 for welding which is formed along the butt weld zone of the steel pipe with the original first-layer weld zone 3 being left behind. FIG. 2(c) illustrates the situation in which the groove 5 in FIG. 2(b) is subsequently subjected to build-up welding with a deposit metal 6. The repair welding is carried out in such a way that, without melting the first-layer weld zone 3 again, the groove 5 is padded by the build-up welding while letting a liquid coolant flow in the steel pipe. Alternatively, it is carried out in such a way that the first-layer weld zone 3 is molten again and solidified under the state of natural cooling, whereupon the second and succeeding layers are deposited again as in the first procedure, i.e., while allowing liquid coolant to flow through the pipe. By such a repair welding process, a residual tensile stress which occurs in the welding heat-affected zone in the inner surface of the steel pipe can be relieved or turned into a residual stress of compression.

EXAMPLE 4

Figure 3A:
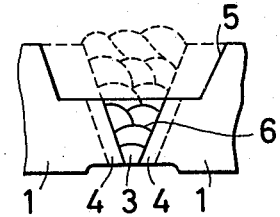
Figure 3B:
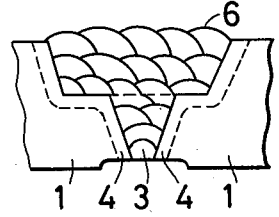

FIGS. 3(a) and 3(b) are model diagrams showing another example in which this invention is applied to the repair welding of a weld zone in a butt-welded steel pipe. FIG. 3(a) illustrates the situation of a groove 5 for welding which is formed in a manner to be wider than the original butt weld zone 2 and to leave a first-layer weld zone 3 and part of the deposit metal 6. FIG. 3(b) illustrates the situation in which the groove 5 in FIG. 3(a) is padded again with additional deposit metal 6. According to this example, the first-layer weld zone 3 is not molten again, and in padding the groove 5 by build-up welding, a liquid coolant is circulated on the inner surface of the steel pipe. By this repair welding process a high residual tensile stress which has been exhibited under the original welded state in the weld zone and heat-affected zone of the inner surface of the steel pipe can be turned into a conspicuously low residual tensile stress or a residual compressive stress.

EXAMPLE 5

Using AISI 304 steel pipes of finish schedule 80 which had various diameters, butt-welded joints as shown in FIG. 2(a) were fabricated by natural cooling and with a similar alloy welding rod (AISI 308L). The weld zones were machined to various depths in the form of grooves along the original weld zone as shown in FIG. 2(b). The first-layer weld zone was left to a thickness of 3 mm. In welding, the first-layer weld zone was left as it was, and the repair welding was performed as stated in Example 1. Water was circulated in the pipe as a liquid coolant, and the flow rate was 7.5 l/min per inch of the diameter of the pipe.

Figure 4:
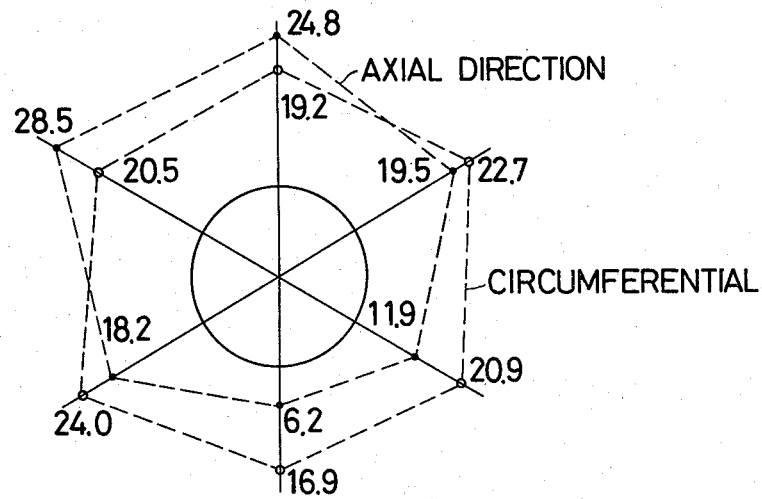
FIG. 4 is a diagram illustrating residual stresses of a welding heat-affected zone in the case where a steel pipe was welded under the state of natural cooling in the prior art.

FIG. 4 is a diagram which illustrates the state of distribution of residual stresses in the circumferential direction (marks o) and the axial direction (marks ·) in the welding heat-affected zone of the inner surface of an AISI 304 pipe (4-inch B schedule 80 pipe) welded by natural cooling. The welding was done by the TIG welding and with an AISI 308L wire under the condition under which the temperatures between the respective layers were made 100°–180° C. As indicated in the figure, the residual stresses were residual tensile stresses of 6.2–28.5 Kg/mm².

Figure 5:
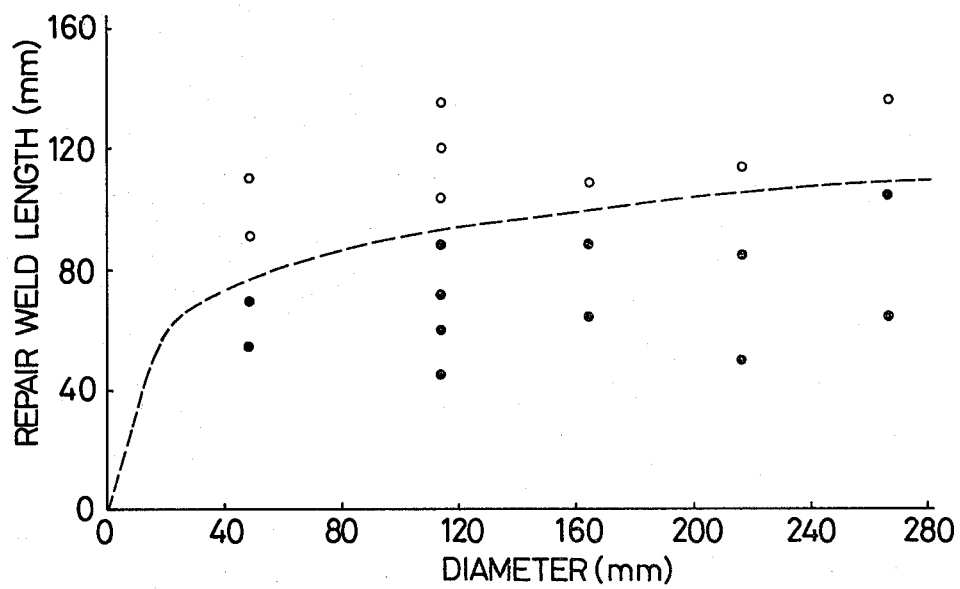
FIG. 5 is a diagram illustrating the relationship of residual stresses between the lengths of repair welding and the diameters of steel pipes in the case where this invention was applied to weld zones of the steel pipes.

FIG. 5 illustrates the relationship between the diameters of steel pipes welded by the method of this invention and the lengths of repair welding along the periphery of the pipe. In this case, a sectional area indicative of the groove shape of the original weld zone except the first-layer weld zone was equal to a sectional area indicative of the groove shape of the repair welding. The original steel pipe is butt-welded by water cooling. Marks (·) in the figure denote residual tensile stresses, and marks (o) residual compressive stresses. A broken line in the figure indicates values obtained from the relation between the repair welding length l (mm) and the steel pipe diameter D (mm) and according to the following equation:

$$l \text{ (mm)} = 45 \log D \text{ (mm)}$$

It has been revealed that the residual stress of the inner surface of the steel pipe can be brought onto the compression side by the repair welding of any length of or above the values indicated by the broken line.

EXAMPLE 6

Using an 8-inch schedule-80 pipe of AISI 304 stainless steel, a butt-welded joint member was fabricated. Regarding the welding operations, the gas tungusten arc TIG welding was employed till the third pass, and the shielded metal arc welding was performed from the fourth pass to the eighth pass while letting city water (30 l/min) flow on the inner surface of the pipe. Welding currents in this case were 100 A (Q=5.4 to 11.6 KJ/cm) for the TIG welding and 75 to 105 A (Q=10.6 to 25.0 KJ/cm) for the arc welding. After the welding operations, a weld zone in a region from one o'clock to two o'clock as viewed on a timepiece was machined by a grinder to form beveled grooves having a depth of 8 mm and lengths of 85 and 115 mm as shown in FIG. 1(b). Thus, two test pieces were prepared. Each groove was subjected to repair welding under the same welding conditions as mentioned above. A residual stress in the inner surface of the pipe in the repair weld zone was a tensile stress of about 1 Kg/mm². Further, a stress corrosion cracking test was carried out by immersing each test piece in a boiling aqueous solution of 42-% magnesium chloride for 24 hours. The test piece was covered with a silicon type coating material so that the etching reagent might contact only with the inner surface of the steel pipe.

After the test, the situation of the weld zone of the steel pipe was observed. Then, no cracking was noted in the test piece of the groove length of 115 mm, and slight cracking was noted in the test piece of the groove length of 85 mm.

EXAMPLE 7

Figure 6:
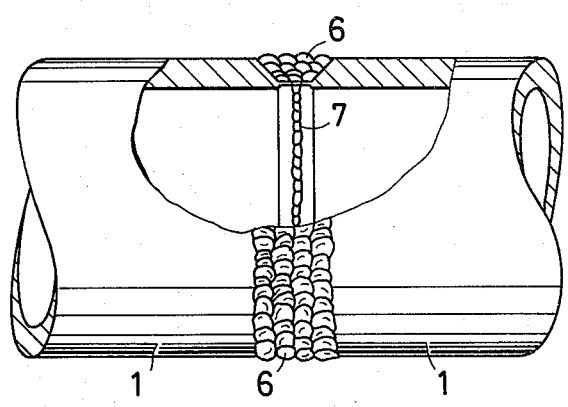
FIG. 6 is a partial sectional view taken along the same axial plane as FIG. 1(a) and is illustrative of the method of making a structure immune against stress corrosion cracking in accordance with the present invention.

A 10-inch AISI 304 stainless steel pipe of finish schedule 80 subjected to butt welding by natural cooling was used. A welding condition was a heat input of about 20 KJ/cm. A residual stress in the inner surface of the steel pipe was measured by a strain gauge, and it was a residual tensile stress of 25 Kg/mm² in the axial direction of a welding heat-affected zone. In the welded joint obtained, a groove for welding as shown in FIG. 6 was formed in the outer surface of the steel pipe. As to the 10-inch pipe having a wall thickness of about 15 mm, the depth of the edge preparation was 2.9 mm, and the width of the groove was 50 mm in the outer surface of the pipe.

Subsequently, the pipe was horizontally fixed and welded under a heat input of about 15 KJ/cm. The cooling of the inner surface of the pipe was conducted while letting water flow at 30 l/min. The temperature of the inner surface of the pipe in the course of welding was measured, and was 350° C. at the highest. The welding residual stress of the inner surface of the pipe was liberated and examined by the strain gauge method, and a compressive stress of 35 Kg/mm² was exhibited in the axial direction of the heat-affected zone.

The test pipe was boiled in a 42-% MgCl₂ solution for 10 hours. As a result, quite no stress corrosion cracking was noted.

Although steel pipes, especially austenite type stainless steel pipes have been referred to in the above examples, this invention is also effective for steel plates. In the case of the steel plates, however, the residual compressive stress which can be added is lower than in the steel pipes of intense self-constraint.

As set forth above, according to this invention, a beveling or a groove for welding is provided in a structure, and it is padded by build-up welding while cooling from the surface opposite thereto, whereby the stress corrosion cracking-resistance of the surface of the structural member in which the stress corrosion cracking is a problem can be remarkably increased, which results in the excellent effect that a structure immune against the stress corrosion cracking is provided. This invention is especially suitable for the repair of a weld zone in a butt-welded steel pipe.

What is claimed is:

1. A method of making a structure immune against stress corrosion cracking which comprises forming a groove on the side of a metallic structure opposite to the side thereof that is to be exposed to a corrosive atmosphere, said groove having a bottom that is formed by a part of the metallic structure that underlies the groove, filling-in the groove with layers of weld metal by build-up welding while cooling by holding a liquid coolant in contact with at least said part on the side to be exposed to the corrosive atmosphere, said part having a thickness equal to at least the thickness of the first layer of the weld metal and said groove having a volume necessary for substantially reducing or eliminating a residual tensile stress on the surface of the side to be exposed to the corrosive atmosphere, owing to shrinkage of the weld metal deposited by the build-up welding.

2. A method of making a structure immune against stress corrosion cracking as defined in claim 1, wherein said liquid coolant is water.

3. A method of making a structure immune against stress corrosion cracking as defined in claim 1, wherein said structure is a pipe.

4. A method of making a structure immune against stress corrosion cracking as defined in claim 3, wherein said pipe is made of austenite type stainless steel.

5. A method of making a structure immune against stress corrosion cracking as defined in claim 3, wherein the cooling is carried out by circulating the liquid coolant in the pipe or by spraying the liquid coolant to the part underlying said groove.

6. A method of making a structure immune against stress corrosion cracking as defined in claim 4, wherein said groove is formed by machining in a weld zone of a butt-welded steel pipe and in the outer surface of said steel pipe, said part of said metallic structure having a thickness at least equal to the thickness of the first layer of weld metal applied to form the weld zone.

7. A method of making a structure immune against stress corrosion cracking which comprises forming a groove by machining away the outer surface of a butt-welded steel pipe in an original weld zone in which the inner surface of the steel pipe is to be exposed to a corrosive atmosphere and filling-in the groove with layers of weld metal by build-up welding while cooling with a liquid coolant in contact with at least a welding heat-affected zone of the inner surface of the steel pipe, said groove being formed to have a volume necessary for substantially reducing or eliminating a residual tensile stress on the inner surface of said steel pipe in the weld zone, owing to shrinkage of the weld metal of the build-up welding, and to leave at least one welding pass layer up to at most a fifth layer of weld metal forming the original weld zone of said butt-welded steel pipe.

8. A method of making a structure immune against stress corrosion cracking as defined in claim 7, wherein said groove is formed to leave a first pass layer of said original weld zone.

9. A method of making a structure immune against stress corrosion cracking as defined in claim 8, wherein the first pass layer in said original weld zone is made molten again and solidified in a state of natural cooling by ambient atmosphere before filling-in the groove by build-up welding while cooling with the liquid coolant.

10. A method of making a structure immune against stress corrosion cracking as defined in claim 8, wherein the length in millimeters of said groove in the circumferential direction is made at least equal to a value obtained by the following equation:

$$L = (45 S_1 \log D)/S_2$$

where D denotes the diameter (in mm) of said steel pipe which is welded by water cooling in which water is in direct contact with an inner surface of the pipe, $S_1$ an area (in mm$^2$) presented by a beveled groove shape of the original weld zone except the first layer, and $S_2$ an area (in mm$^2$) presented by a beveled groove shape of the build-up welding.

11. A method of making a structure immune against stress corrosion cracking as defined in claim 10, wherein said groove has a width greater than that of the original weld zone.

12. A method of making a structure immune against stress corrosion cracking which comprises forming a groove in the outer surface of a butt weld zone of an austenite type stainless steel pipe whose inner surface is exposed to a corrosive atmosphere to leave at least the first layer of the weld metal forming the original weld zone, and depositing weld metal in said groove by build-up welding with austenite type stainless steel while cooling the steel pipe by flowing a liquid coolant in said steel pipe or by spraying a liquid coolant on the inner surface beneath said first layer of the weld zone, said groove having a volume necessary for substantially reducing or eliminating a residual tensile stress on the inner surface of said steel pipe in the original weld zone, owing to shrinkage of the metal deposited by the build-up welding.

13. A method of making a structure immune against stress corrosion cracking which comprises forming a groove in an outer surface of a butt weld zone of an austenite type 304 stainless steel pipe used in piping of an atomic energy plant, said pipe being butt welded by water cooling in which water is in direct contact with an inner surface of the pipe and said groove being formed to leave an original first layer of weld metal forming the butt weld zone of said stainless steel pipe, and filling-in said groove by build-up welding with a deposit weld metal having the same composition as the metal in the original weld zone while cooling by flowing a liquid coolant in said steel pipe or by spraying a liquid coolant onto the surface beneath the first layer of said weld metal forming the butt weld zone, said groove having a length L in millimeters which is equal to at least a value obtained by the following equation:

$$L = (45 S_1 \log D)/S_2$$

wherein D denotes a diameter (in mm) of said steel pipe, $S_1$ an area (in mm$^2$) presented by the groove shape of the butt weld zone except the first layer, and $S_2$ an area (in mm$^2$) presented by the groove shape of the build-up welding.

14. A method of making a structure immune against stress corrosion cracking as defined in claim 7, wherein said groove is formed in the entire circumference of said steel pipe when said pipe has been butt welded with natural cooling.